Figure 1:
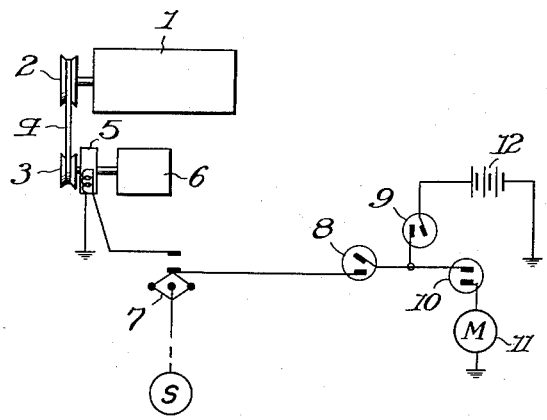

Feb. 18, 1964    REINOSUKE KOYANAGI    3,121,314
APPARATUS FOR PREVENTING OVERHEATING OF ENGINE OF VEHICLE
EQUIPPED WITH AIR-CONDITIONING SYSTEM
Filed April 11, 1962

INVENTOR:
REINOSUKE KOYANAGI
BY:
*M. Glew and Toren*
ATTORNEYS

United States Patent Office 3,121,314
Patented Feb. 18, 1964

3,121,314
APPARATUS FOR PREVENTING OVERHEATING OF ENGINE OF VEHICLE EQUIPPED WITH AIR-CONDITIONING SYSTEM
Reinosuke Koyanagi, Kanagawa-ku, Yokohama-shi, Japan, assignor to Tokyo Shibaura Denki Kabushiki Kaisha, Kawasaki-shi, Japan, a joint-stock company of Japan
Filed Apr. 11, 1962, Ser. No. 186,768
2 Claims. (Cl. 62—133)

This invention relates to apparatuses for preventing engine overheating in a powered vehicle, particularly a motor vehicle, (hereinafter called a "car") equipped with an air-conditioning system including an engine-driven refrigerant compressor.

In a car equipped with an air-conditioning device including an engine driven refrigerant compressor, the compressor imposes an additional load on the engine so that where the engine capacity is not ample, as in relatively small cars, there is often a tendency for the engine to be overloaded, whereby various troubles due to overheating are caused. Especially when a car is running at low speed with frequent starting and stopping in congested city streets or climbing a steep and long slope, the cooling effect of the radiator of the engine is decreased, or the engine is overloaded, resulting in its overheating. In order to prevent engine overheating, it has hitherto been proposed to use a device including a relay responsive to the rotational speed of an engine and adapted to disengage the refrigerant compressor from the engine, thereby to prevent engine overheating when the engine operates at low speed. Such a device operates to control the refrigerant compressor in response to only the speed of the engine, but when the car is climbing a slope the engine itself usually operates at a speed sufficiently high to actuate the said relay to couple the refrigerant compressor to the engine while the car is running at low speed. Accordingly, with such a prior device there is the defect that engine overheating cannot be prevented when a car is climbing a steep and long slope, making a quick start, or passing other vehicles.

It is an object of this invention to provide a novel means without such defect for preventing engine overheating.

When the car speed exceeds a certain value, for example, 20 kilometers per hour, the speed of natural cooling air passing through the engine radiator is sufficiently high to effectively cool the engine, so that it will not be overheated even when a refrigerant compressor is coupled thereto. This invention is based on this fact, and according to the invention, coupling between a car engine and a refrigerant compressor is controlled in response to the car speed regardless of the engine speed, whereby the above mentioned defect is eliminated.

Briefly stated, in accordance with this invention, a car speed responsive device is provided for a car equipped with an air conditioning system or a cooler including an engine-driven refrigerant compressor, and said car speed responsive device is arranged in a control circuit for an electromagnetic clutch between said engine and compressor.

Figure 2:
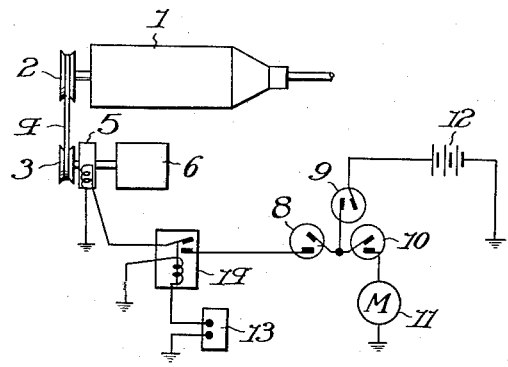

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a schematic representation of one embodiment of this invention, and
FIG. 2 is a schematic representation of a modification of this invention.

Referring now to FIG. 1 of the accompanying drawing, a refrigerant compressor 6 is arranged to be driven from a car engine 1 through pulleys 2 and 3, a belt 4 hung on said pulleys and an electromagnetic clutch 5. Although not shown in the drawing, it will be understood that the compressor 6 constitutes a part of an air conditioning system or cooler for the car including a condenser, an evaporator, and an air circulating fan. The electromagnetic clutch 5 or coupler is so constructed that it will connect the compressor 6 to the engine 1 when energized and disconnect the former from the latter when de-energized. According to this invention, in the circuit of the energizing coil of the electromagnetic coupler 5 is included a suitable car speed responsive device such as, for example, a centrifugal switch 7 driven by a gear for driving the speedometer of the car, said switch being connected in series with a control switch 8 for the air conditioning device and an engine switch 9 across a battery 12. An electric motor 11 for driving an air circulating fan is connected to the battery through the engine switch 9, a fan switch 10, and ground.

FIG. 2 is identical with FIG. 1 excepting that in lieu of a car speed responsive switch 7, an electric relay 14 is used, said relay 14 being energized by current from a tachometer generator 13 adapted to be driven in response to the speed of the car. Other parts of FIG. 2 are designated by the same reference numerals as in FIG. 1.

The operation of the above-mentioned apparatuses is as follows:

Referring to FIG. 1 or 2, the car is set to run by closing switches 8 and 9. While the car speed is below a predetermined value as at starting, low-speed running, or climbing a slope, the switch 7 or the relay 14 is in its opened state so that the clutch 5 is disengaged and the compressor 6 is inoperative. Thus, the refrigerant compressor 6 is positively disengaged from the engine 1 so as to prevent engine overheating while the car is running at such low speed as to cause engine overheating in such a case as starting, low-speed running, or climbing a slope. When the car speed exceeds said predetermined value, for example, 20 kilometers per hour, the switch 7 or relay 14 is closed to energize the electromagnetic clutch 5, thereby causing the compressor 6 to be driven by the engine and to commence air conditioning of the car. As pointed out above, when the car speed is above 20 kilometers per hour, sufficient flow of cooling air is assured for the radiator, not shown, associated with the engine and overheating thereof can be positively prevented even when the compressor is driven as an additional load.

In a preferred arrangement a vehicle speed sensing means such as a speedometer S is connected to rotate the centrifugal switch 7 to actuate the latter at a predetermined speed.

Thus, according to this invention improved means for preventing engine overheating is provided wherein a simple switch responsive to the speed of the car is used for controlling the coupling between the car engine and a refrigerant compressor, whereby the compressor is positively disconnected from the engine while the car is running at low speed.

While the invention has been described by illustrating preferred embodiments thereof, it will be understood that this invention is not limited thereto. It is, of course, intended to cover in the appended claims all such modifications and changes as fall within the true spirit and scope of this invention.

What I claim as new and desire to secure by Letters Patent of the United States is:

1. In combination, means, including a prime mover, for preventing prime mover overheating of a prime mover powered vehicle equipped with an air conditioning system and a speedometer for indicating the vehicle speed, comprising a refrigerant compressor of said air conditioning system, an electromagnetic clutch between said prime mover and said compressor, a switch for controlling said electromagnetic clutch, and means for actuating said switch in response to a predetermined speed of said vehicle speedometer so as to disengage said compressor from said prime mover when the speed of said vehicle is below said predetermined speed.

2. In combination, means, including an engine for preventing overheating of the engine of an engine-powered vehicle equipped with a speedometer for indicating the vehicle speed and an air conditioning system which includes a refrigeration compressor powered by the engine through a disengageable coupling means which normally couples the compressor with the engine; said apparatus comprising an electromagnetic clutch operable for disengaging the coupling means, and means connected to said speedometer and directly responsive to the speed of the vehicle for operating said electromagnetic clutch when the speed of the vehicle is less than a predetermined speed.

References Cited in the file of this patent
UNITED STATES PATENTS 2,881,597   Jacobs _____ Apr. 14, 1959